United States Patent [19]

Shirasaki

[11] 4,370,019
[45] Jan. 25, 1983

[54] OPTICAL SCANNING DEVICE WITH TEMPERATURE CONTROL MEANS

[75] Inventor: Takayuki Shirasaki, Yokohama, Japan

[73] Assignee: Canon Kabushiki Kaisha, Tokyo, Japan

[21] Appl. No.: 104,845

[22] Filed: Dec. 18, 1979

[30] Foreign Application Priority Data

Dec. 23, 1978 [JP] Japan .................. 53-163272
Dec. 23, 1978 [JP] Japan .................. 53-163273
Dec. 23, 1978 [JP] Japan .................. 53-163274
Aug. 28, 1979 [JP] Japan .................. 54-109458

[51] Int. Cl.³ .............. G02B 27/17; H02K 33/00; H02D 5/06
[52] U.S. Cl. ..................... 350/6.6; 318/127
[58] Field of Search ................ 350/6.5–6.91, 350/486, 487, 6.1; 250/235, 230; 324/97; 346/108; 358/208; 318/128, 127

[56] References Cited

U.S. PATENT DOCUMENTS

| | | | |
|---|---|---|---|
| 3,020,414 | 2/1962 | McKnight et al. | 350/6.6 |
| 3,068,361 | 12/1962 | Lannan | 250/230 |
| 3,509,458 | 4/1970 | Girard | 324/97 |
| 3,612,642 | 10/1971 | Dostal | 350/6.6 |
| 3,624,574 | 11/1971 | Montagu | 324/97 |
| 4,090,112 | 5/1978 | Selverstone | 350/6.5 |
| 4,108,532 | 8/1978 | Minoura | 350/6.6 |
| 4,135,119 | 1/1979 | Brosens | 350/6.1 |

FOREIGN PATENT DOCUMENTS

| | | | |
|---|---|---|---|
| 54-39140 | 3/1979 | Japan | 350/6.6 |
| 54-56848 | 5/1979 | Japan | 350/6.6 |

*Primary Examiner*—Jon W. Henry
*Attorney, Agent, or Firm*—Fitzpatrick, Cella, Harper & Scinto

[57] ABSTRACT

An optical scanning device has a mirror for light scanning, a motor composed of an armature and a stator, a case for supporting said stator of the motor, a torsion rod for generating a restituting force against the driving force of said motor to limit the rotating angle of said armature, and a speed detecting element. Said torsion rod is fixedly supported at one end thereof by said case and rotatably supported at the other end thereof by a bearing member. Said mirror, said armature and said speed detecting element are provided between both the supported ends of said torsion rod.

16 Claims, 18 Drawing Figures

OPTICAL SCANNING DEVICE WITH TEMPERATURE CONTROL MEANS

BACKGROUND OF THE INVENTION

1. Field of the Invention

The present invention relates to an optical scanning device for deflection scanning with light, and more particularly to an optical scanning device wherein a mirror is fixed to and driven by a reversible rotary motor of which the rotating angle of the rotary vibrator is limited by the restituting force of a torsion spring rod functioning against the driving force of the motor.

2. Description of the Prior Art

In the prior art there are already known optical scanning devices for deflection scanning of light modulated with information signals for the purpose of recording such signals on a scanned plane having a photosensitive member or reading information from such plane.

One such optical scanning device comprises a rotary vibrator composed of a torsion spring rod fixed at one end thereof to the motor body and provided at the other end thereof with a mirror, with an armature made of a material of a high magnetic permeability and with a speed detecting element, and a stator provided with a permanent magnet, a drive coil and a speed detecting coil to constitute a motor magnetic circuit and a speed detecting magnetic circuit of the reversible rotary motor. The drive coil of the stator is supplied with a sinusoidal current to generate a drive torque proportional to said current thereby causing a self resonance in a vibrating system defined by the inertial force, attenuating force and restituting force of said vibrator at a frequency specific thereto. The signals generated by said speed detecting magnetic circuit and representing the phase and amplitude of the vibration of said vibrator are supplied to a control circuit to supply a controlled voltage to said stator drive coil thereby stabilizing the vibrating amplitude of said vibrator. Such optical scanning device is disclosed for example in the U.S. Pat. Nos. 3,609,485, 3,624,574 and 3,921,045.

In the optical scanning device of the above-mentioned type, when the vibrator is subjected to a forced vibration by a sinusoidal current of a frequency $\omega = 2\pi f$ with a drive torque T ($=$F. sin $\omega t$), the amplitude of said vibration is approximately proportional to the drive torque or the drive current. In order to obtain a large amplitude with a small drive current, the vibration is conducted in a so-called resonance state wherein the drive frequency $\omega$ is equal to the proper vibration frequency $\omega_n$ of the vibrator. In such case, the frequency $\omega_R$, amplitude $\theta_R$ and sharpness Q of the resonance can be represented by the following equations under the condition that the attenuation constant $\gamma$ of the vibrating system is very small ($<<1$):

$$\omega_R = \sqrt{K/m} \text{ wherein } K = \pi dG/32l \tag{1}$$

$$\theta_R = F/\gamma\omega_R \tag{2}$$

$$Q = \frac{1}{2}\delta \text{ wherein } \delta = \gamma/2\sqrt{mK} \tag{3}$$

wherein m is the inertial moment of the vibrator, K is the suspension stiffness (spring constant) of the torsion spring rod constituting the vibrator, d and l are respectively the diameter and length of the spring portion of said torsion spring rod, G is the transversal elasticity coefficient of the material constituting said torsion spring rod, and $\delta$ is a so-called attenuation ratio which is a function of temperature as shown in the equation (3).

In the designing of a vibrator of the above-mentioned optical scanning device, at first the suspension stiffness K is determined from the required vibrating amplitude in consideration of the material to be employed for the torsion spring rod and the shearing stress generated therein during the vibration, and is utilized for calculating the dimensions d and l of the torsion spring rod according to the equation (1) and also for determining the inertial moment m of the vibrator as a function of the required resonant frequency $\omega_R$. The vibrator designed in this manner generally assumes a structure of a thin oblong torsion spring rod provided at the upper end thereof with the mirror of a relatively large inertial moment, the speed detecting element and the armature. The vibrator of such structure, when assembled in the motor, tends to incline at the upper end by the magnetic attraction of the magnetic circuit, and is therefore unable to provide a stable oscillation or unable to provide a sufficient vibration accuracy of the mirror even if the vibration can be stabilized. Besides, the vibrator is characterized by the drawback of being susceptible to an external vibration in a direction perpendicular to the axis of the vibrator.

Also the torsion spring rod, which is generally composed of a resilient material such as spring steel, stainless steel or beryllium steel, changes the dimensions (d and l) thereof and the transversal elasticity coefficient G as a function of circumferential temperature, thus resulting in a change in the resonant frequency $\omega_R$ and the resonant amplitude $\theta_R$ as will be understood from the equations (1) and (2). In case of a vibrator with a resonant frequency of for example 1 KHz, said change in frequency in response to a temperature rise of ca. 20° C. from the normal temperature amounts to 1 to 3 Hz, which is by no means negligibly small in high-precision scanning for example required in a laser recording apparatus.

The equations (2) and (3) indicate that the vibrating amplitude $\theta_R$ under a constant sinusoidal current in the stator drive coil is proportional to the sharpness Q of the resonance, which can be made larger for a larger value of the suspension stiffness K of the torsion spring rod or of the inertial moment of the vibrator, and for a smaller value of attenuation coefficient $\gamma$ of the vibrating system. Consequently, in the aforementioned optical scanning device, the resonance sharpness Q can be improved by reducing the attenuation coefficient as far as possible.

SUMMARY OF THE INVENTION

The object of the present invention is to provide an optical scanning device of improved precision adapted for use for example in a laser recording apparatus and not characterized by the aforementioned drawbacks resulting from the prior vibrator structure or from the material of the torsion spring rod.

More specifically a first object of the present invention is to provide an optical scanning device wherein the vibrator is composed of a torsion spring rod supported at both ends thereof and provided with the mirror, speed detecting element and armature between said supported ends. A second object of the present invention is to provide an optical scanning device wherein the temperature in the motor is controlled at a determined value by a thermosensitive element provided in the motor. A third object of the present invention is to provide an optical scanning device wherein the torsion spring rod is composed of a constant-elasticity alloy showing a very small temperature-dependent change of the resonant frequency. Still another object of the present invention is to provide an optical scanning device wherein the mirror is placed in a totally enclosed vibrating chamber for improving the sharpness of the resonance. Still another object of the present invention is to provide a light beam recording apparatus utilizing a high-precision optical scanning device. Still other objects of the present invention will be made apparent from the following description on the embodiments thereof.

DESCRIPTION OF THE PREFERRED EMBODIMENTS

Figure 1:
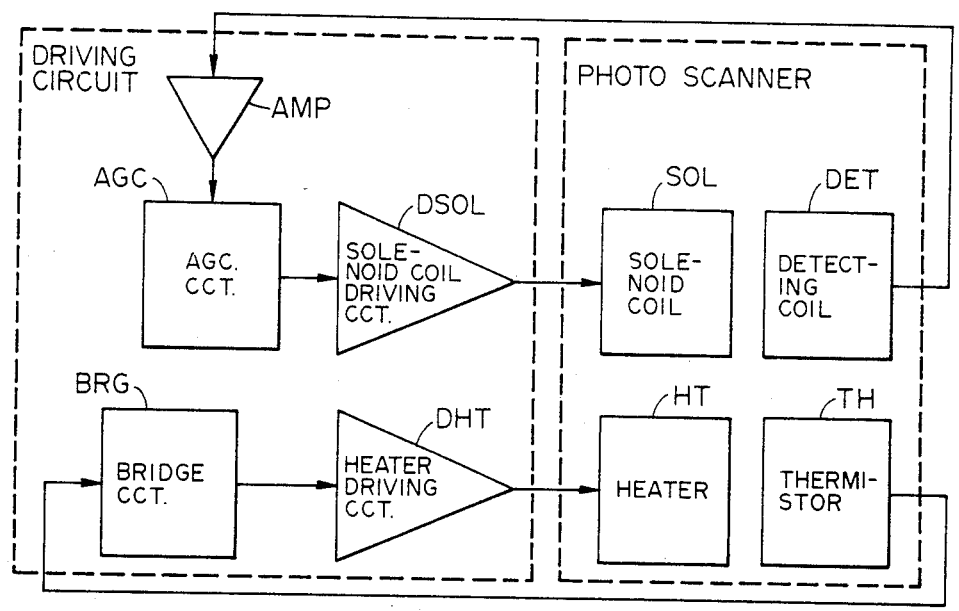
FIG. 1 is a block diagram showing the working principle of the optical scanning device.

Referring to FIG. 1 showing the working principle of the optical scanning device, the phase and amplitude of the vibration of the vibrator are detected by a detecting coil DET of which output signal is amplified by an amplifier AMP and supplied to an automatic gain control AGC to control the voltage supplied to the solenoid coil SOL so as to obtain a constant vibration amplitude.

Also as the mechanical properties (resonant frequency, elasticity coefficient etc.) of the vibrator in such optical scanning device are susceptible to temperature change and are unable to provide the vibration of a high precision, there is provided in the optical scanning device a thermister Th for temperature detection of which output signal is utilized for controlling a heater HT thereby maintaining a constant temperature in said device.

Figure 5:
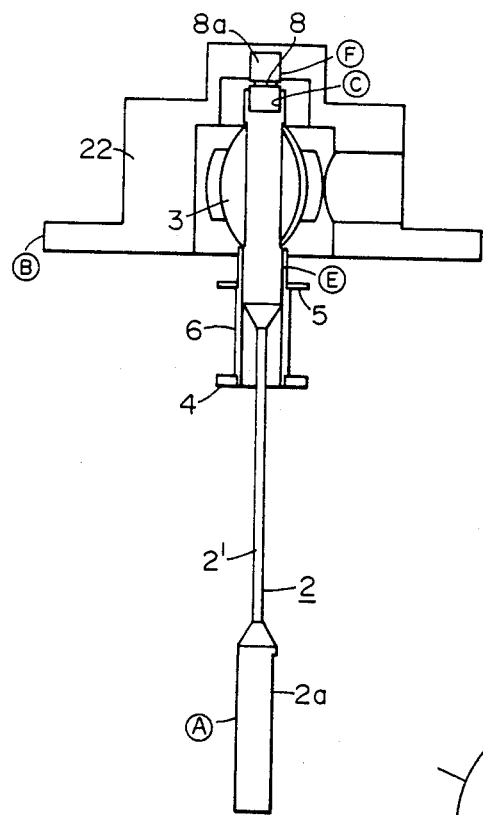
FIG. 5 is a longitudinal cross-sectional view of another embodiment of the vibrator.

Now referring to the following drawings, 1 is a motor body provided with a mount portion 1a and a screwed hole 1b, and also with coaxial fitting portions A, B and D. 2 is a torsion spring rod comprising a precision-worked torsion spring portion 2' and provided with coaxial fitting portions A, C and E, and further with a notch 2a for positioning and a notch 2b for mirror mounting respectively between said fitting portions A, E and C. 3 is a mirror for light beam scanning affixed with an adhesive material to said notch 2b of the torsion spring rod 3, and 4 is an armature of a material of a high magnetic permeability affixed to the lower portion of a cylindrical shaft 6 mounted to the torsion spring rod 2 at the fitting portion E thereof and provided with arc-shaped magnetic poles 4a, 4b at regular intervals along the circumference of said cylindrical shaft 6. 5 is a speed detecting element of a material of a high magnetic permeability affixed on the upper portion of said cylindrical shaft 6 and provided with arc-shaped magnetic poles 5a, 5b at regular intervals along the circumference of said cylindrical shaft. 7 is a low-torque miniature ball bearing utilizing oil as lubricant and mounted on the fitting portion C of the torsion spring rod. In FIG. 5, 8 represents a frictionless, lubrication-free cross flexure bearing similarly mounted on the fitting portion C of the torsion spring rod. In the optical scanning device of the present invention, the vibrator is composed by the aforementioned torsion spring rod 2, mirror 3, armature 4, speed detecting element 5, cylindrical shaft 6 and ball bearing 7 or cross flexure bearing. 9 are paired core elements made of laminated plates of a high magnetic permeability such as magnetic silicon steel or Ni-Fe alloy and each composed of arc-shaped magnetic core portions 9a, 9b and a bridge portion 9c. The bridge portions 9c are respectively provided with solenoid coils 10, which are mutually connected in series or in parallel and further connected through lead wires 11 to a solenoid coil drive circuit DSOL. The paired core elements 9 having said solenoid coils 10 are sandwiched between upper and lower fixing members 12, 13 having a fitting portion D therein and firmly united by caulking pins 14, in such a manner that the arc-shaped magnetic pole faces 9a, 9b of said core elements 9 are placed coaxially with the fitting portion D of said upper and lower fixing members 12, 13. 15 are rectangular permanent magnets placed in pair between said paired core elements 9 to generate a determined biasing magnetic flux (Φa) passing through said magnetic pole faces 9a, 9b and the armature pole faces 4a and 4b. 16 is a speed detecting plate of a high magnetic permeability fixed to the upper fixing member 12 with screws 17 and having an arc-shaped pole face 16 coaxial with the central axis y—y' and a magnetic circuit 16b. 18 is a speed detecting coil mounted on said magnetic circuit 16b and connected through lead wires 11 to the amplifier AMP of the drive circuit. As a weak static magnetic field (Φa) caused by the permanent magnet 15 in the magnetic circuit 16b of the speed detecting plate 16 passes through the speed detecting element 5, the rotational vibration thereof generates a change in the magnetic flux proportional to the angular variation to induce a voltage in the speed detecting coil 18 proportional to the rotational speed of the detecting element 5 relative to the speed detecting plate 16.

In the optical scanning device of the present invention, the stator is composed of the above-mentioned core elements 9, solenoid coils 10, upper and lower fixing members 12, 13, permanent magnets 15, speed detecting plate 16, speed detecting coil 18 etc.

The above-mentioned stator is mounted to the motor body 1 coaxially with said fitting portion D by means of unrepresented screws, whereby the pole faces 9a and 9b of the core elements of said stator are positioned coaxially with the fitting portion A of the motor body. A tubular member 22 having a fitting portion F for receiving the outer ring 7a of the ball bearing 7 or the fixing ring 8a of the cross flexure bearing 8 for the vibrator is fixed to the motor body 1 at the fitting portion B thereof coaxial to said fitting portion F by means of screws 23. Said tubular member 22 is provided with a mirror chamber 22a for enclosing aforementioned mirror 3, and also with an entrance window 22b and an exit window 22c for the light beam LB.

The optical scanning device of the present invention can be easily assembled by inserting the vibrator together with the tubular member 22 into the motor body 1 having the fitting portions A and B from the top thereof, then fixing said tubular member 22 with screws 23, and fitting the notched portion 2a at the lower end of the torsion spring rod to the screwed hole 1b of the motor body 1 and tightening the fixing screws 24 for mounting the vibrator at a determined angular position with respect to the stator. At this assembly the vibrator is fixed at the upper and lower ends thereof in an axially aligned position by the structure of the tubular member 22 and of the fitting portions A and B, and is axially positioned automatically with respect to the stator in the motor body 1, so that the pole faces 9a, 9b of the core elements and the pole face 16a of the speed detecting plate 16 are respectively positioned in mutually corresponding relationship to the armature pole faces 4a, 4b and the pole face 5a of the speed detecting element 5.

In the above-mentioned structure, a sinusoidal current in the stator solenoid coils 10 constituting a part of a movable-core type reversible rotary motor induces a control magnetic flux ($\Phi b$) in the illustrated direction in the magnetic circuit composed of the core element pole faces 9a, armature pole faces 4a, 4b and core element pole faces 9b, so that the static magnetic field ($\Phi a$) generated by the permanent magnets 15 between the pole faces 9a and 4a and also between the pole faces 4b and 9b in the illustrated direction induces a difference in magnetic force between the pole faces 9a and 4a and also between the pole faces 4b and 9b to generate a strong anticlockwise attractive force to the armature 4 in the illustrated case. The generated drive torque, and therefore the angular displacement of the armature 4, are approximately proportional to the current. In this manner the vibrator composed of the armature 4, speed detecting element 5, mirror 3 etc. initiates a self-resonant oscillation with the proper oscillating frequency of the vibrator in response to said sinusoidal current. Thus the mirror 3 fixed to the torsion spring rod of the vibrator performs a rotational vibration in the lateral direction with a determined amplitude, thereby deflecting the light beam entering through the entrance window 22b of the tubular member 22 over an angular range twice as large as said angular vibrating amplitude and emitting thus deflected light beam through the exit window 22c.

Also a weak magnetic flux ($\Phi c$) of the illustrated direction present in the speed detecting magnetic circuit composed of the permanent magnets 15, pole face 5a of the speed detecting element, pole face 16a of the speed detecting plate 16, magnetic circuit 16b thereof and speed detecting coil 18 induces a change in the magnetic flux in the magnetic circuit 16b proportional to the angular displacement of the speed detecting element 5 in response to the vibration of the vibrator, thus inducing a sinusoidal voltage in the speed detecting coil 18 in proportion to the rotational speed of the speed detecting element. The detected signal is supplied as the information on the phase and amplitude of the vibration to the drive circuit, and further supplied, after amplification, as a positive feed-back voltage, to the solenoid coils 10 through the automatic gain control circuit AGC which controls the voltage to the solenoid coil 10 so as to maintain a constant amplitude of the vibrator.

As explained in the foregoing, the optical scanning device of the present invention is featured in that a torsion spring rod is fixed at an end thereof to the motor body and supported at the other end thereof rotatably by a bearing member, and that said rod is provided with a mirror, an armature and a speed detecting element in positions between the supported ends thereof. Such structure eliminates the inclination of the mirror resulting from the vibrator structure and also from the effect of the magnetic field of magnetic circuit, thus improving the vibration performance, precision of mirror oscillation in the optical beam scanning operation and resistance of the vibrator against the external vibration in the lateral direction.

Besides the foregoing embodiment is featured in that the body of the optical scanning device is divided into the motor body 1 having two mutually coaxial and differently sized fitting portions and the tubular member 22 likewise having two mutually coaxial and differently sized fitting portions. The smaller fitting portion of said motor body is utilized for fixing the lower end of said torsion spring rod while the smaller fitting portion of said tubular member 22 is utilized for fixing the upper end of said torsion spring rod through a bearing member. The internal diameter of the larger fitting portion of the motor body or the larger fitting portion of said tubular member is selected larger than the outer diameter of said armature or speed detecting element to allow insertion from the top of the torsion spring rod attached to said tubular member into the motor body with incorporated stator, thereby facilitating the assembling and reducing the cost of the parts. However the motor body 1 and the tubular member 22 are not necessarily limited to the structure shown in FIG. 2 but may be respectively divided for example into two members as represented by broken lines in FIG. 2.

In the optical scanning device of the aforementioned structure, the relative angular position of the pole face of the armature or the speed detecting element in the vibrator respectively with respect to the pole face of the core elements or the speed detecting plate in the stator is important in order to achieve a higher motor efficiency or to obtain a more exact sinusoidal output. In the vibrator of the present invention, the mirror 3, armature 4 and speed detecting element 5 are mounted on the torsion spring rod 5 with precisely determined angular positions, and the fitting portion at the lower end of said torsion spring rod is provided with a notched portion 2a, so that it is rendered possible to easily obtain precise mutual angular relationship between the magnetic pole faces by inserting the vibrator together with the tubular member from the top into the motor body with the stator, aligning the notched portion 2a of the torsion spring rod to the screwed hole 1b of the motor body 1, and tightening the fixing screws 24.

Figure 6A:
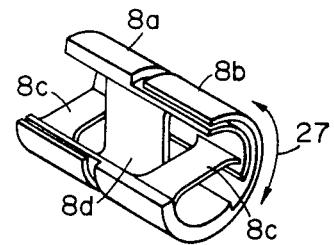
FIG. 6A is a partially cut-off perspective view of a cross flexure bearing.
Figure 6B:
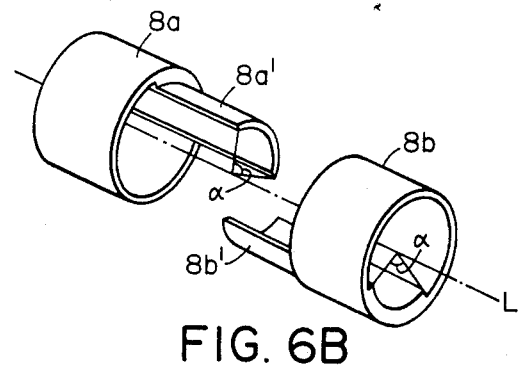
FIG. 6B is an exploded perspective view of cross flexure bearing showing the components thereof.

The bearing member for supporting the upper end of the vibrator of the present invention can be composed of a ball bearing or a cross flexure bearing. In such vibrator, in order to increase the proper vibrating frequency it is desirable to minimize the inertial moment m of said vibrator, and it is also required to reduce the attenuation resistance $\gamma$ in order to obtain a larger amplitude $\theta_R$ with lower drive current and voltage. As the bearing member in the foregoing embodiment there is employed a miniaradial ball bearing lubricated with particularly low-friction oil. FIGS. 6a and 6b show the cross flexure bearing composed of a stainless fixed ring 8a and a stainless rotary ring 8b mutually fitted in such a manner that the members 8a' and 8b or members 8a and 8b' do not mutually contact and are mutually connected with plate springs 8c and 8d with a small spring constant in such a manner that the ring 8a is coaxial with the ring 8b, so that there is no contact or friction between said rings. The paired plate springs 8c are positioned parallel to each other and perpendicular to the plate spring 8d. Assuming that the center angle of the inner members 8a' and 8b' of the fixed and rotary rings 8a, 8b is $\alpha$, the rotary ring 8b is rendered rotatable over an angular range of $180° - \alpha$ as shown by the arrows around the neutral position with respect to the fixed ring 8a. Because of the above-mentioned friction-free character and the small spring constant of the plate springs 8c and 8d, the cross flexure bearing allows easy and stable oscillation of the vibrator.

Figure 2:
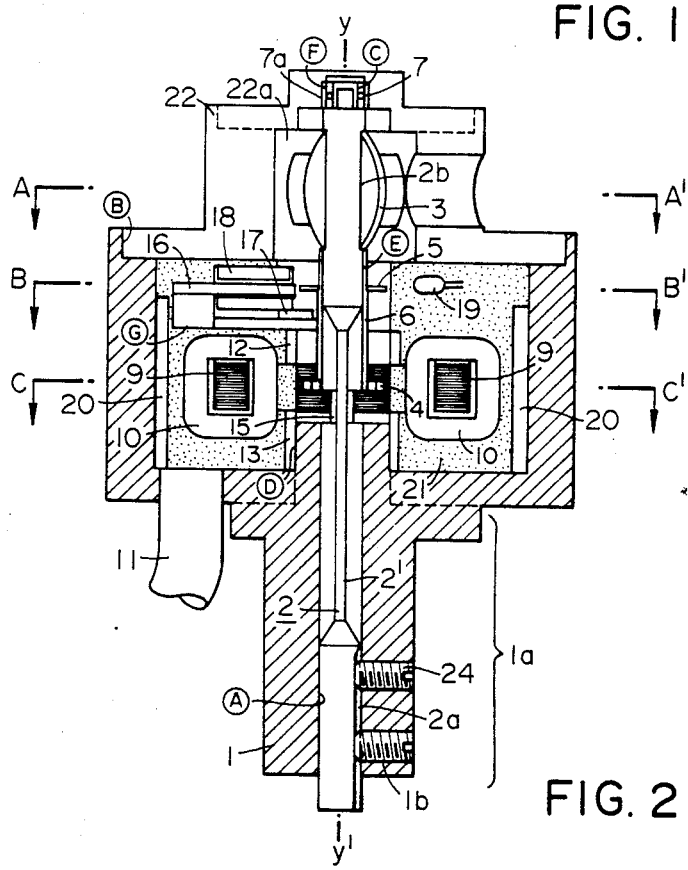
FIG. 2 is a longitudinal cross-sectional view of the optical scanning device.
Figure 7:
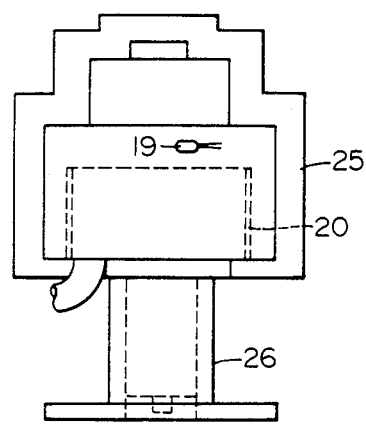
FIGS. 7 and 8 are longitudinal cross-sectional views of the optical scanning device provided with temperature control.

In the embodiments shown in FIG. 2 or FIG. 7, the optical scanning device is further provided with a thermister 19 as the temperature detecting element and a heater 20 in the motor body 1. There may naturally be employed other temperature detecting elements such as a thermocouple. The thermister 19 is positioned close to the speed detecting plate, while the thin heater 20 is positioned between the stator and the motor body 1 and fixed to the latter. The interior of the motor body 1, accommodating the stator, thermister 19 and heater 20, is patted with an epoxy resin 21 of an elevated thermal conductivity.

In response to the temperature detection inside the optical scanning device by the thermister Th shown in FIG. 1, a heater drive circuit DHT controls the current supply to the heater to maintain the temperature inside the device at a determined value, which is generally selected equal to the maximum circumferential temperature of the optical scanning device.

This temperature control eliminates the change in the suspension stiffness of the torsion spring rod, thus allowing the change in the proper vibration frequency or in the amplitude of the vibrator due to temperature changes to be ignored. In the present invention the optical scanning device is effectively warmed by the heater 20 of a thin plate shape, as it is incorporated in and mounted at one face thereof to the motor body 1 and covered at the other face with the epoxy resin of high thermal conductivity.

In the embodiment shown in FIG. 7, in order to improve the thermal efficiency of the motor, the optical scanning device is surrounded by a thermal insulating material 25, which is for example composed of a foamed polyethylene sheet of a low thermal conductivity and which is adhered to the entire external surface, except the entrance and exit windows, of the optical scanning device. 26 is a cylindrical support for supporting the mounting portion 1a of the scanning device and made for example of a polycarbonate resin of low thermal conductivity.

Figure 8:
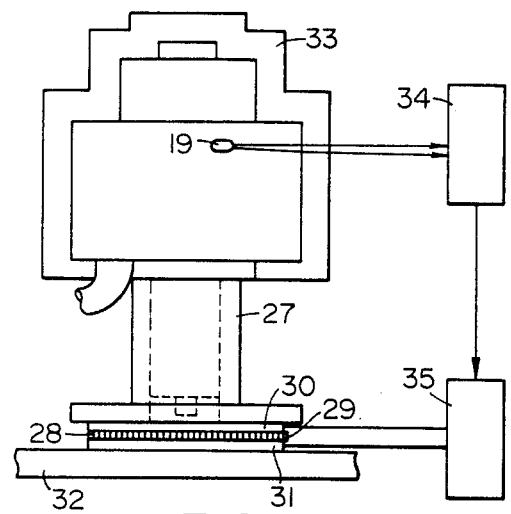

In the following example another embodiment of the high-precision optical scanning device is explained. This embodiment also employs an ordinary non-resilient metallic material for the torsion spring rod, and in order to stabilize the mechanical characteristics of the vibrator a temperature detecting element 19 is incorporated in the motor body 1 as shown in FIG. 8 and thermally adhered thereto through an epoxy resin of a high thermal conductivity. 27 is a tubular metal member of a high thermal conductivity thermally adhered to the mounting portion 1a of the optical scanning device and further thermally adhered at the lower end thereof to a cooling plate 30 of a Peltier cooling element 28 functioning as temperature control means. As already known, the Peltier cooling element 28 is composed of a Peltier effect element 29 sandwiched between an upper metal plate 30 functioning as an electrode and cooling plate and a lower metal plate 31 functioning as an electrode and heat radiating plate, wherein said metal plates 30, 31 are respectively covered with insulating layers composed for example of a ceramic material. The lower metal plate 31 is thermally adhered to another heat radiating plate of a larger heat radiating effect. 33 is a heat insulating material covering the upper part of the scanning device. 34 is a temperature detecting circuit, while 35 is a temperature control circuit.

Referring to FIG. 8, the temperature detecting element 19 detects the temperature inside the scanning device and supplies an output voltage to the temperature detecting circuit 34, which in turn supplies a signal to the temperature control circuit 35 so as to perform cooling or heating respectively when the detected temperature is higher or lower than the predetermined temperature. In case of cooling the temperature control circuit 35 supplies a current to the Peltier element 28 through metal plates 30, 31 to cause heat radiation from the lower face of the plate 31 and through the plate 32 and heat absorption on the upper face of the plate 30 thereby cooling the scanning device. On the other hand, in case of heating the Peltier element 28 is supplied with an inverse current to cause heat absorption and heat radiation respectively at the lower face of plate 31 and the upper face of plate 30 thereby cooling the scanning device. In either case the optical scanning device is stabilized at a predetermined temperature after a certain time, so that the suspension stiffness of the torsion spring is rendered stable regardless of the change in the circumferential temperature.

The Peltier effect element utilized as the temperature control means may naturally be replaced by other electronic cooling elements.

Figure 9:
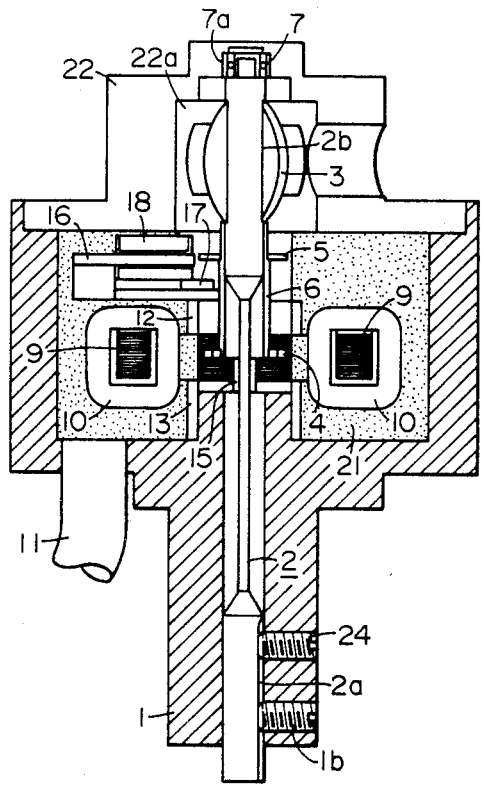
FIG. 9 is a longitudinal cross-sectional view of another embodiment of the optical scanning device.
Figure 10:
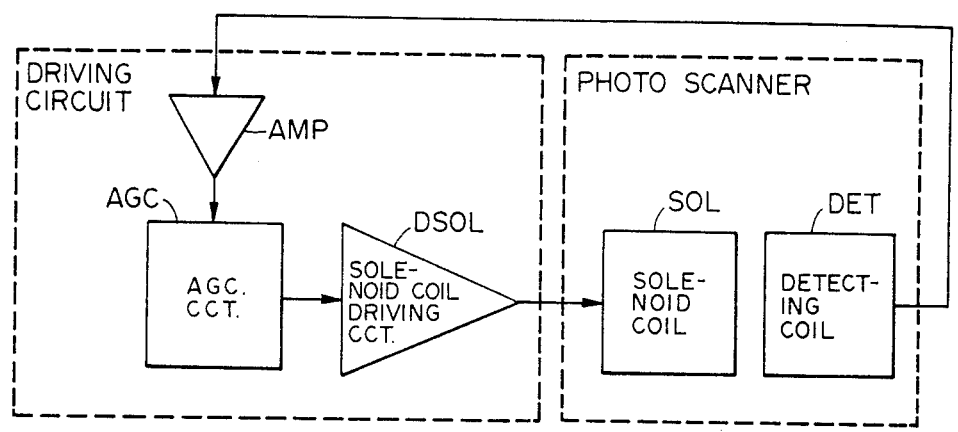
FIG. 10 is a block diagram of the control system for the optical scanning device shown in FIG. 9.

FIGS. 9 and 10 are a longitudinal cross-sectional view of another embodiment of the optical scanning device and a block diagram showing the working principle thereof, wherein the components equivalent to those shown in FIGS. 2 and 1 are represented by same numbers or symbols as in FIGS. 2 and 1. In the embodiment shown in FIG. 9, the thermister 19 as the temperature detecting element and the heater 20 shown in FIGS. 2 and 7 are dispensed with by the use, for the torsion spring rod 2, of a constant-elasticity material of which the temperature coefficient of the resonant frequency is substantially constant in the normal temperature range or the elasticity coefficient is not affected by the temperature, for example Ni-span C alloys such as those composed of 43% of Ni, 5% of Cr, 3% of Ti, 0.5% of Co and remaining portion of Fe. The torsion spring rod 2 is preferably made of a constant-elasticity alloy having an absolute value of the temperature coefficient of the resonant frequency not exceeding $1 \times 10^{-6}/°C$. in the normal temperature range from 0° to 50° C. The use of such constant-elasticity material for the torsion spring rod is extremely advantageous costwise since the temperature control circuit for controlling the heater 20 can be eliminated from the control circuit as shown in FIG. 10.

Figure 11:
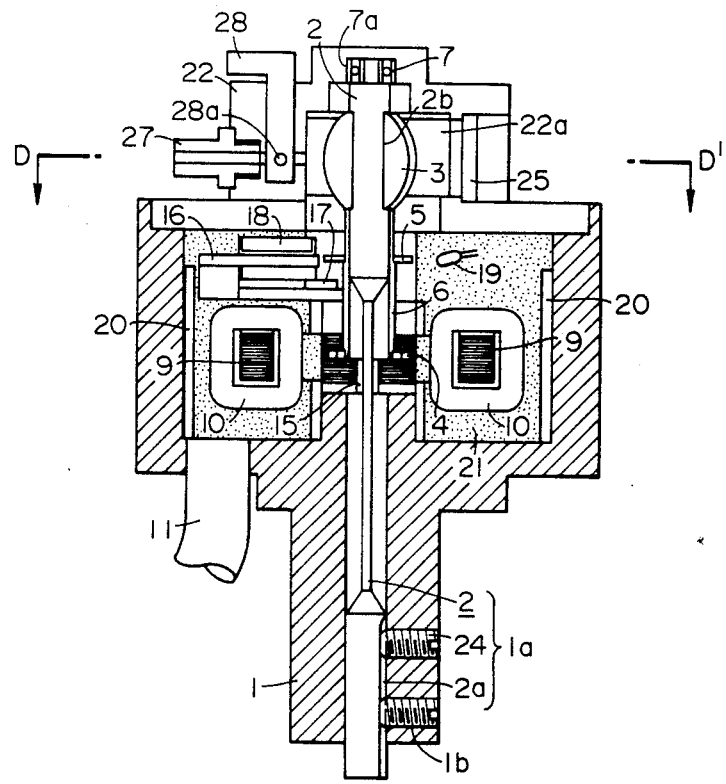
FIG. 11 is a longitudinal cross-sectional view of still another embodiment of the optical scanning device.
Figure 12:
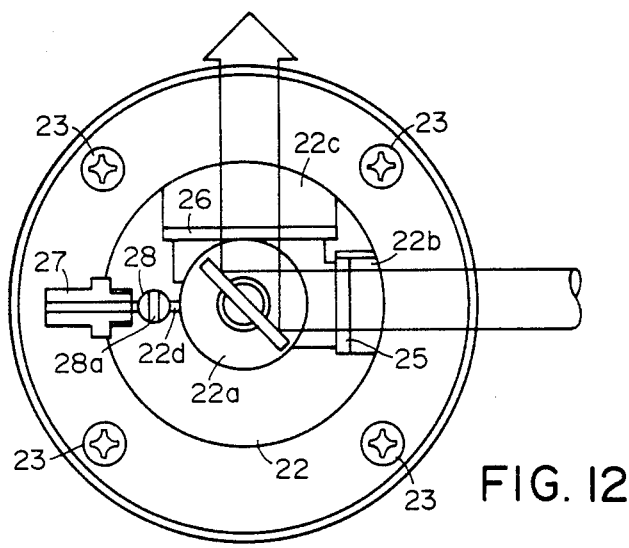
FIG. 12 is a transversal cross-sectional view along the line D—D' in FIG. 11.
Figure 13:
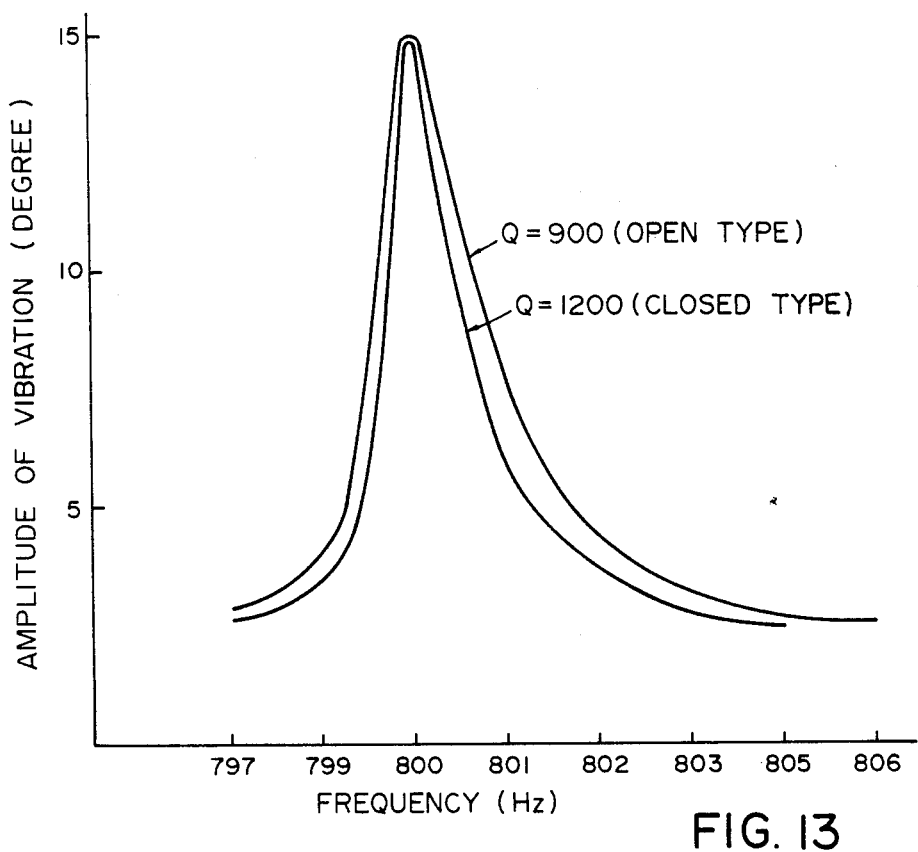
FIG. 13 is a frequency-amplitude chart of the optical scanning device.

FIGS. 11 and 12 respectively are a longitudinal cross-sectional view of still another embodiment of the optical scanning device of the present invention and a transversal cross-sectional view thereof along the line D—D' shown in FIG. 11, and FIG. 13 is a chart showing the frequency characteristics of said optical scanning deivce.

Figure 3A:
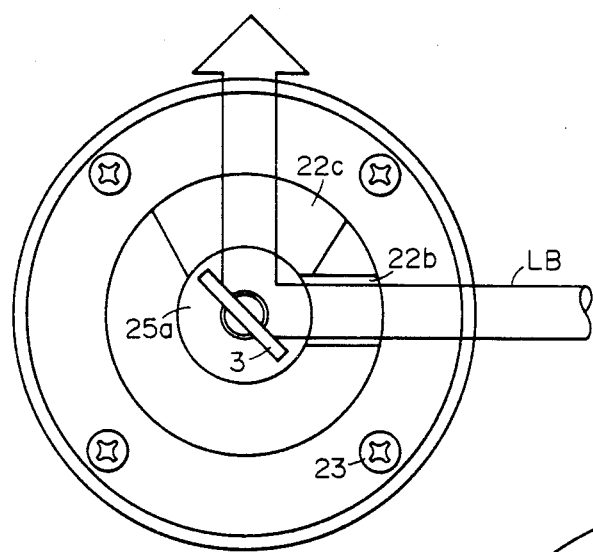
FIGS. 3A, 3B and 3C are transversal cross-sectional views respectively along the lines A—A', B—B' and C—C' in FIG. 2 and respectively showing a light beam entrance-exit portion, a speed detecting magnetic circuit portion and a motor magnetic circuit portion.
Figure 3B:
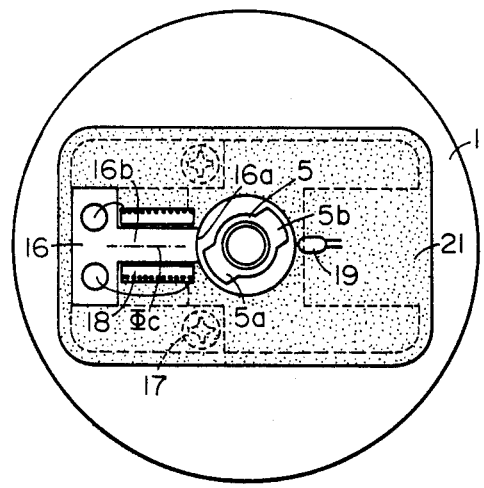
Figure 3C:
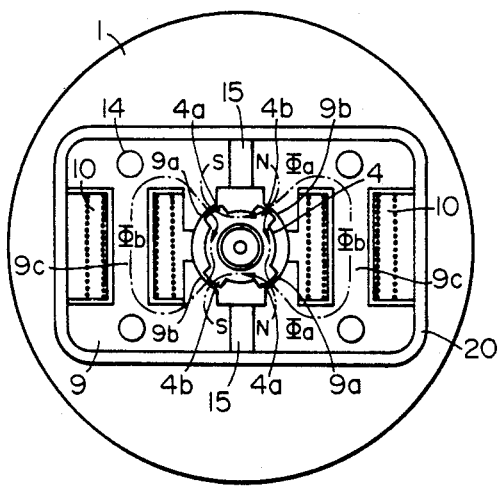
Figure 4A:
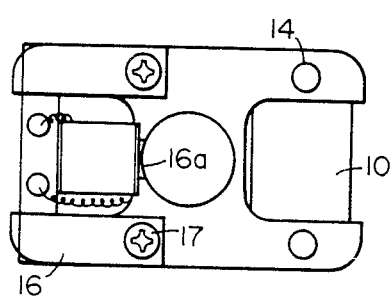
FIG. 4A is a plan view of a stator.
Figure 4B:
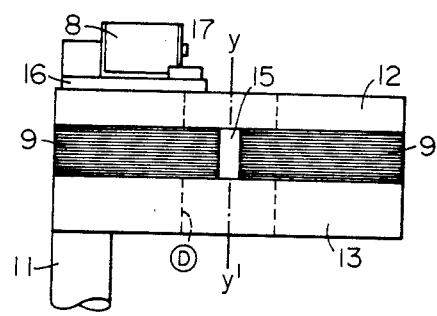
FIG. 4B is a lateral view of the stator.

In FIGS. 11 and 12, the components equivalent to those shown in FIGS. 2 and 3 are represented by same numbers as in FIGS. 2 and 3.

In FIGS. 11 and 12, 25 is a glass plate functioning as an optical member for covering the entrance window 22b of the tubular member 22, while 26 is a glass plate for covering the exit window 22c. The optical members 25 and 26 function to prevent entry of dust into the mirror chamber 22a in the tubular member 22, and to insulate the mirror chamber 22a from the external air flow thereby stabilizing the air around the mirror 3. Said optical members 25 and 26 are positioned in such a manner that the air layer around the mirror 3 can be made as thin as possible.

As already explained in the foregoing, the optical scanning device of the present invention shows a superior performance as the attenuation coefficient $\gamma$ shown in the equations (2) and (3) becomes smaller. Namely a smaller value of $\gamma$ allows the resonance sharpness Q to increase, thereby enabling a large amplitude with a small power consumption to be obtained and to improve the stability of frequency and the linearity of amplitude.

In the present embodiment, the attenuation coefficient $\gamma$ of the torsion vibration is determined by the air resistance of the vibrator, particularly of the mirror, in the vibration thereof. In order to reduce the air resistance in the present embodiment there are provided optical members 25 and 26 respectively on the entrance and exit windows 22b and 22c of the tubular members 22 in such a manner as to minimize the air layer around the mirror 3. As a result the sharpness Q of the resonance, which is 900 in the conventional mirror chamber with uncovered windows, is significantly improved to 1,200 by the use of the mirror chamber with covered windows.

The frequency characteristics thus obtained are shown in FIG. 13 in a form of the amplitude in ordinate versus the frequency in abscissa.

Furthermore in the present embodiment, the tubular member 22 is provided, as shown in FIGS. 11 and 12, with an air hole 22d for extracting the air from the mirror chamber 22a and a valve 28. As the optical scanning device is completely sealed, there can be maintained a vacuum in the mirror chamber 22a by extracting the air from the mirror chamber 22a by means for example of a vacuum pump through said valve 28 and an air extracting member 27 and then closing said valve 28. In this manner it is possible to further reduce the attenuation coefficient $\gamma$ of the vibrator including the mirror 3 thereby increasing the sharpness Q of the resonance and improving the accuracy and performance of the optical scanning device.

As explained in the foregoing, the present invention provides an optical scanning device of an improved sharpness Q of the resonance since as the space (mirror chamber 22a) in which the vibrating mirror is accommodated is insulated from the external atmosphere to reduce the air resistance received by the mirror during the vibration thereof. Also it is rendered possible to further improve the sharpness Q by extracting the air from said space to maintain a reduced pressure therein.

Figure 14:
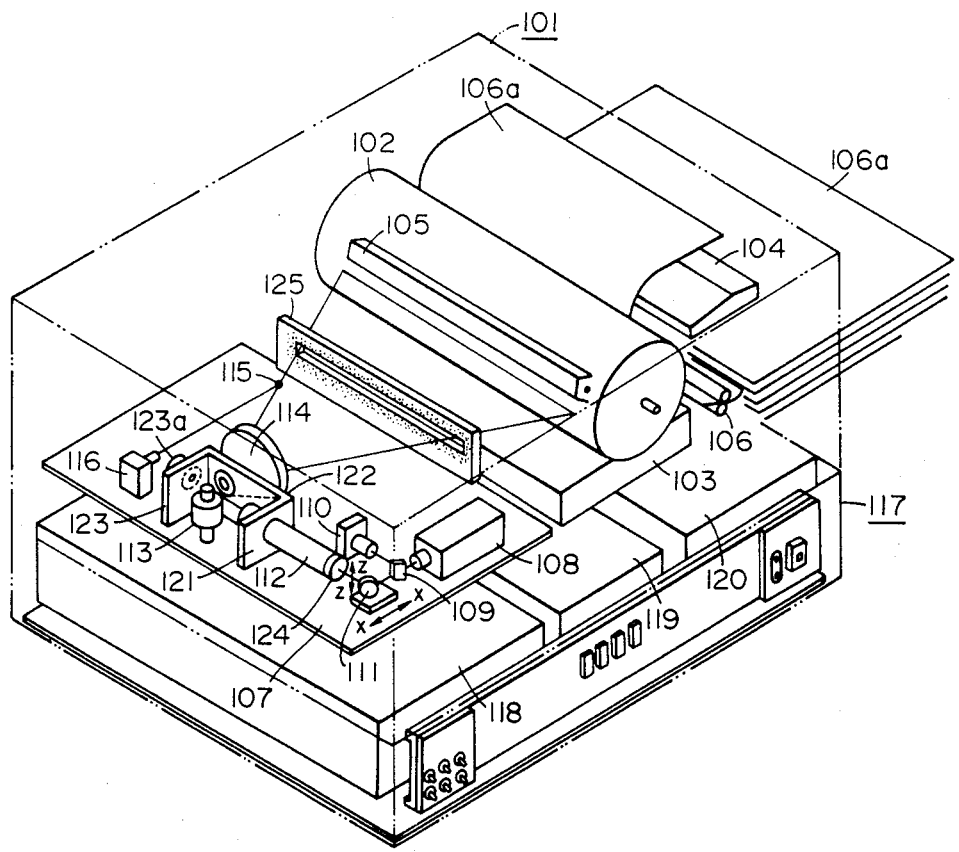
FIG. 14 is a partially removed perspective view of a laser beam printer utilizing the aforementioned optical scanning device.

Reference is now made to FIG. 14 showing a laser recording apparatus adapted for use of the optical scanning device of the present invention. In FIG. 14 there is shown a recording unit 101 utilizing an electrophotographic process and comprising a photosensitive drum 102, a developing unit 103, a heat fixing unit 104, a charger 105, a paper feed mechanism 106, a recording sheet 106a, wherein an electrostatic latent image formed on the photosensitive drum 102 by a known electrophotographic process in response to an image light is rendered visible by means of the charger 105 and the developing unit 103, and an image resulting from said latent image is recorded on the recording sheet 106a supplied from said paper feed mechanism 106. In said recording unit 101 there is accommodated an optical table 107 for supporting the aforementioned and other optical elements. More specifically said optical table 107 is provided thereon with a laser diode element 108 used as the light source for supplying an image information beam to the photosensitive drum 102, a semi-transparent mirror 109 for partially transmitting and partially reflecting the laser beam emitted by said laser element, a beam intensity detector 110 for detecting the laser beam reflected by said semi-transparent mirror 109, a mirror 111 for deflecting the laser beam transmitted by said semi-transparent mirror 109, a beam expander lens 112 for enlarging the beam diameter of the laser beam reflected by said mirror 111, an optical scanning device 113 according to the present invention for scanning the surface of said photosensitive drum 102 with the laser beam, an imaging lens 114 for focusing the laser beam put into scanning motion by said scanning device 113 onto said photosensitive drum, a beam position detecting mirror 115 positioned in the vicinity of the scan start point of the scanning beam emitted by said imaging lens 114 to reflect said scanning beam, and a beam position detector 116 for generating a start signal in response to the laser beam received from said mirror 115. In a lower case there are accommodated a power source 118, a sequence control unit 119 and an image signal control circuit 120. Also on said optical table 107 there are provided a plate 121 having a mounting hole for said expander lens 112, a plate 122 having a mounting hole for said imaging lens and a plate 123 having a hole for optical axis collimation and a photodetector on the opposite side of said hole, in such a manner that the centers of said holes are optically aligned.

Also in front of said expander lens 112 there is detachably mounted a disc 124 having a hole for optical axis collimation in such a manner that the center of said hole coincides with the optical axis of said expander lens. Around the holes in said plate 123 and said disc 124 there is provided a phosphorescent material emitting a visible light in response to activation with a light in the wavelength range of 8000–9000 A.

The position of the laser beam image can be determined by removing said optical scanning device 113 and forming the image of the laser beam emitted from said expander lens 112 on the phosphorescent material provided on said plate 123. Also said laser beam can be made parallel to the optical axis of said expander lens by rotating said mirror 111. Thus the output from the photodetector 123a mounted on said plate 123 becomes maximum when the optical path is collimated in such a manner that the entire laser beam passes through the holes in said plate 123 and said disc 124. In this manner it is rendered possible to confirm, from the output of said photodector 123a, the exact collimation of the optical path. Also on said optical table 107 and between said imaging lens 114 and photosensitive 102 there is provided a plate 125 having an oblong hole for transmitting the scanning beam in such a manner that the center in the shorter side of said oblong hole coincides with the center of the plane scanned by said imaging lens 114. Around said oblong hole there is also provided the aforementioned phosphorescent material of which light emission allows to identify the position of the scanning beam on said plate 125.

As explained in the foregoing, the optical scanning device of the present invention is featured in that the torsion spring rod is supported at both ends thereof and is provided with a mirror, an armature and a speed detecting element between said supported ends thereby improving the vibration performance and the mirror oscillation precision as a precision optical scanning device, and also improving the vibration resistance of the vibrator used therein.

Also the present invention is featured in that a temperature detecting element is provided in the motor casing together with temperature control means such as a heater or an electronic cooling element to rapidly control the temperature in the motor, thereby stabilizing the resonant frequency and the vibrating amplitude, and further in that a material of a constant elasticity is employed for the torsion spring rod to obtain a high-precision optical scanning device with stabilized resonant frequency and vibrating amplitude.

Furthermore the present invention is featured in that the space accommodating the vibrating mirror of the vibrator is totally insulated from the outer space to reduce the air resistance received by said mirror, thereby providing a high-performance optical scanning device of an improved resonance sharpness Q adapted for use in a laser recording apparatus.

What I claim is:

1. An optical scanning device, comprising:
a mirror for light scanning;
a motor including an armature and a stator;
a torsion member, said mirror being mounted with said torsion member and said armature being mounted on said torsion member to be rotated by said motor, said torsion member being adapted for generating a restituting force against the driving force of said motor to limit the rotating angle of said armature and thereby, said mirror;
temperature detecting means disposed opposite said torsion member for detecting the temperature around said torsion member; and
temperature control means disposed opposite said torsion member for controlling the atmosphere around said torsion member in response to the detection output of said detecting means.

2. An optical scanning device according to the claim 1, wherein said temperature control means is a heater.

3. An optical scanning device according to claim 1, further comprising a casing supporting said stator therein, wherein said casing is potted with an epoxy resin.

4. An optical scanning device according to the claim 2, comprising a casing supporting said stator of said motor, wherein said heater is placed in said casing.

5. An optical scanning device according to the claim 1, wherein said temperature control means is an electronic cooling element.

6. An optical scanning device according to the claim 1, wherein the optical scanning device is circumferentially covered with a heat insulating material.

7. An optical scanning device according to claim 1, further comprising a casing supporting said stator of said motor therein, wherein said torsion rod is supported at one end thereof firmly by said casing and at the opposite end thereof rotatably by a bearing member, mounted in said casing, wherein said torsion rod is provided with said mirror, and said armature is thus positioned between said supported ends of said torsion rod.

8. An optical scanning device, comprising:
a mirror for light scanning;
a motor including an armature and a stator;
a torsion member, said mirror being mounted with said torsion member and said armature being mounted on said torsion member to be rotated by said motor, said torsion member generating a restituting force against the driving force of said motor to limit the rotating angle of said armature and thereby said mirror;
temperature detecting means disposed opposite a portion of said torsion member that is rotated by said motor; and
temperature control means for controlling the temperature around said torsion member in response to the detection output of said temperature detecting means.

9. An optical scanning device according to claim 8, further comprising a casing for supporting said stator of the motor, wherein said temperature control means is placed in said casing.

10. An optical scanning device according to claim 9, wherein the inner room of said casing is potted with high thermal conductivity resin.

11. An optical scanning device, comprising:
a mirror for light scanning;
a motor including an armature and a stator;
a torsion member, said mirror being mounted with said torsion member and said armature being mounted on said torsion member to be rotated by said motor, said torsion member generating a restituting force against the driving force of said motor to limit the rotating angle of said armature and thereby said mirror;
temperature detecting means for detecting the temperature around said torsion member; and
temperature control means for controlling the temperature in response to the detection output of said temperature detecting means, said temperature detecting means being located nearer to said torsion member than is said temperature control means.

12. An optical scanning device according to claim 11, comprising a casing supporting the stator of said motor, wherein said temperature control means is placed in said casing.

13. An optical scanning device, comprising:
a mirror for light scanning;
a motor including an armature and a stator;
a casing for supporting said stator of the motor;
a torsion member, said mirror being mounted with said torsion member and said armature being mounted on said torsion member to be rotated by said motor, said torsion member generating a restituting force against the driving force of said motor to limit the rotating angle of said armature and thereby said motor;
temperature detecting means disposed opposite said torsion member; and
temperature control means for controlling the temperature of said torsion member through said casing in response to the detection output of said temperature detecting means.

14. An optical scanning device according to claim 13, wherein said temperature control means is an electronic cooling element.

15. An optical scanning device, comprising:
an oscillator including a torsion member, a mirror and an armature;
fixing means for fixing one end of said torsion member;
a driving member having a stator for oscillating said oscillator;
a temperature sensor provided around said stator; and
temperature control means provided around said stator for controlling the temperature in response to the output of said temperature sensor.

16. An optical scanning device according to claim 15, further comprising a holding member provided at the other end of said torsion member for holding said torsion member for rotation.

* * * * *